J. A. MANSEAU.
CATERPILLAR CATCHER.
APPLICATION FILED JAN. 7, 1919.
1,311,001.
Patented July 22, 1919.
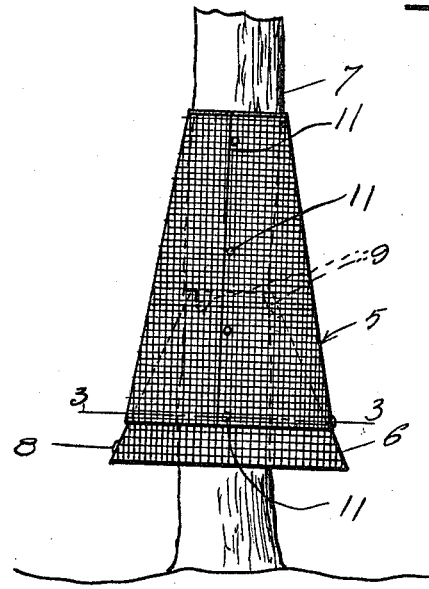
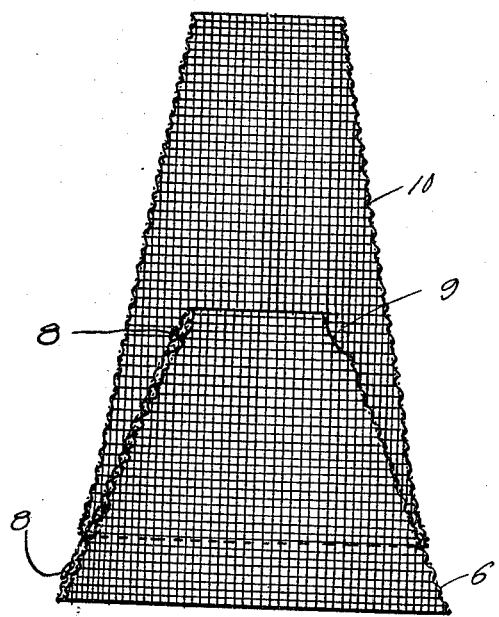
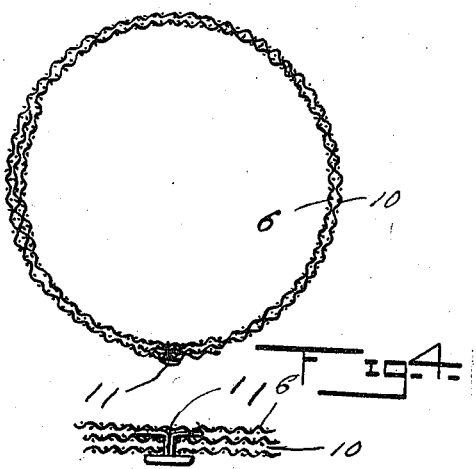
Inventor
J. A. Manseau

UNITED STATES PATENT OFFICE.

JOHN ALFRED MANSEAU, OF BECANCOUR, QUEBEC, CANADA.

CATERPILLAR-CATCHER.

1,311,001.　　　　Specification of Letters Patent.　　Patented July 22, 1919.

Application filed January 7, 1919. Serial No. 270,052.

*To all whom it may concern:*

Be it known that I, JOHN ALFRED MANSEAU, a subject of the King of Great Britain, residing at Becancour, in the Province of Quebec, Dominion of Canada, have invented certain new and useful Improvements in Caterpillar-Catchers; and I do hereby declare the following to be a full, clear, and exact description of the invention, such as will enable others skilled in the art to which it appertains to make and use the same.

My invention relates to improvements to insect catchers and more particularly to caterpillar catchers.

An important object of this invention is to provide an insect catcher adapted to successfully combat caterpillars in orchards and other places wherein they are very destructive and cause considerable damage to fruit trees and the like.

A further object of the invention is to provide a caterpillar catcher of the character described, which is adapted for attachment to the trunk of a tree to prevent the caterpillars from gaining access to the upper portion of the tree.

A further object of the invention is to provide a device of the character described, which is easy to apply to a tree, reliable in use, of highly simplified construction and cheap to manufacture.

Other objects and advantages of the invention will be apparent during the course of the following description.

In the accompanying drawings forming a part of this specification and in which like numerals are employed to designate like parts throughout the same, Figure 1 is a side elevation of a caterpillar catcher embodied in my invention, showing the same applied to the trunk of a tree, Fig. 2 is a central vertical longitudinal sectional view through the same, Fig. 3 is a horizontal section taken on the line 3—3 of Fig. 1, and, Fig. 4 is an enlarged detail horizontal section taken through a portion of the device, showing the fastening means therefor.

In the drawings wherein for the purpose of illustration is shown the preferred embodiment of my invention, the numeral 5 generically designates my improved caterpillar catcher, which in manufacture may be made of ordinary screen wire. A conical shaped strip of wire 6 is adapted to be arranged on a trunk 7. The strip of wire 6 is adapted to be folded upon itself as clearly shown in Fig. 3 and secured by rivets or pins 8 clearly shown in Fig. 4. The rivets or pins 8 extend through the several thicknesses of wire which overlap and its end portions are bent outwardly as shown. The upper portion of the conical shaped member 6 is adapted to engage the trunk 7 and is provided with spaced openings 9. The spaced openings 9 are adapted to permit of the passage of caterpillars up the side of the tree.

Adapted to be arranged over the conical shaped member 6 and to encircle the trunk 7 is a second conical shaped member 10. The member 10 comprises a strip of mesh wire adapted to be passed about the tree and has its edges overlap. Pins or rivets 11 extend through the overlapped portion and are similar in construction to the pins 8. As shown in Fig. 1 the conical shaped member 10 is adapted to have its lower edge engage the conical shaped member 6 at a point spaced from its lower edge. The upper circumferential edge of the conical shaped member 10 is adapted to snugly engage the trunk 7.

In the use of my device, it will be apparent that the caterpillar in crawling up the trunk, will pass through the openings 9 in the upper portion of the conical shaped member 6. The engagement of the upper portion of the outer conical member 10 with the trunk 7, will prevent the caterpillar from going farther than the member 10, thus entrapping the caterpillar between the several conical shaped members.

While I have shown and described the preferred embodiment of my invention, it is understood that I may make such minor changes in arrangement and construction of parts as will remain within the spirit of the invention and the scope of the appended claims.

Having thus described my invention, what I claim is:

1. A caterpillar catcher comprising, a conical shaped member adapted to be arranged on the trunk of a tree; said conical shaped member having its upper portion contacting with the trunk of the tree and having spaced openings about its upper edge; and a second conical shaped member adapted to encircle the trunk of a tree and arranged above the first named conical member, said second named conical member adapted to have its upper portion in contact with the trunk of the tree and having its lower edge in engagement with the first named conical member at a point spaced from its lower edge, said upper conical member being tapered more gradually than the lower conical member thereby providing an annular trap chamber.

2. An insect catcher comprising, a strip of mesh wire adapted to encircle the trunk of a tree, said strip of mesh wire having its edges overlapping; means to secure the overlapping edges together, said strip of mesh wire forming a conical member; a second piece of mesh wire adapted to be passed about the tree and having its edges overlap, said second named piece of mesh wire forming a second conical shaped member adapted to be disposed beneath the first named conical member; and means to secure the overlapping edges of the second named conical member together; said second named conical member having openings in its upper edge to permit of the passage of insects to the space between the two conical shaped members, said first named conical member being more gradually tapered than the second named conical member thereby providing an annular trap chamber.

In testimony whereof I affix my signature in presence of two witnesses.

JOHN ALFRED MANSEAU.

Witnesses:
ROMIO DOUCET,
E. A. LEMAIRE.

Copies of this patent may be obtained for five cents each, by addressing the "Commissioner of Patents, Washington, D. C."